(12) United States Patent
Zuccato

(10) Patent No.: US 7,517,543 B2
(45) Date of Patent: Apr. 14, 2009

(54) PROCESS FOR THE PREPARATION OF A VEGETABLE YOGURT

(75) Inventor: Remo Zuccato, Vicenza (IT)

(73) Assignee: Paseluma Elettrica S.r.L., Chiuppano (Vicenza) (IT)

( * ) Notice: Subject to any disclaimer, the term of this patent is extended or adjusted under 35 U.S.C. 154(b) by 278 days.

(21) Appl. No.: 11/076,510

(22) Filed: Mar. 9, 2005

(65) Prior Publication Data

US 2005/0153017 A1   Jul. 14, 2005

Related U.S. Application Data

(60) Division of application No. 10/313,442, filed on Dec. 6, 2002, now Pat. No. 6,875,455, which is a continuation-in-part of application No. 09/809,763, filed on Mar. 15, 2001, now abandoned.

(30) Foreign Application Priority Data

Mar. 22, 2000  (IT) ........................ VI2000A0049

(51) Int. Cl.
*A23B 7/10* (2006.01)
(52) U.S. Cl. ............................ 426/49; 426/51; 426/52; 426/615
(58) Field of Classification Search .................. 426/42, 426/43, 44, 49, 51, 52, 583, 615, 626, 629
See application file for complete search history.

(56) References Cited

U.S. PATENT DOCUMENTS 4,971,810 A * 11/1990 Hoyda et al. ................... 426/43
7,108,881 B2 * 9/2006 Akashe et al. ............... 426/422

FOREIGN PATENT DOCUMENTS

| EP | 0988793 | * | 9/1999 |
| JP | 56113257 | * | 9/1981 |
| WO | 92/08362 | * | 5/1992 |

* cited by examiner

*Primary Examiner*—Leslie Wong
(74) *Attorney, Agent, or Firm*—Bucknam and Archer

(57) ABSTRACT

There is described a process for the production of a vegetable yogurt formed by fermentation of vegetable products such as green vegetables and fruits under the action of lactic acid bacteria. In the first phase the vegetable substrate is prepared whereby the green vegetables and/or fruit are homogenized. then water is added to obtain a creamy or liquid product which is then pasteurized. Afterwards the cultures of lactic acid bacteria are inoculated whereby the fermentation step is carried out at a temperature depending on the strain of lactic acid bacteria being used until the pH reaches a value of about 3.8-4.5, at which point fragrances and/or thickening agents, fruit puree, or fruit in small pieces or cereals are added and the product is packaged.

6 Claims, No Drawings

PROCESS FOR THE PREPARATION OF A VEGETABLE YOGURT

REFERENCE TO RELATED APPLICATION

This is a divisional of co-pending application Ser. No. 10/313,442, filed Dec. 6, 2002, now U.S. Pat. No. 6,875,455, which is a continuation-in-part of application Ser. No. 09/809,763, filed Mar. 15, 2001, now abandoned.

FIELD OF THE INVENTION

This invention relates to a process capable of allowing the preparation of a vegetable yogurt as well as the vegetable yogurt produced by this process.

BACKGROUND OF THE PRIOR ART

It is known that the lactic fermentation of alimentary products of animal origin (milk, meat) or vegetable origin (cabbage, olives, cucumbers, etc.) is a method used since time immemorial to conserve food. In this method there is provided that the lactic acid bacteria present in nature or suitably added to the raw material determine the fermentation of the present sugar thus producing organic acids. The lowering of the pH which follows causes the inhibition of several microbic species, thus increasing in this manner the hygienic-sanitary safety and the conservability of the food. In addition, the metabolic activities of the microorganisms responsible for the lactic fermentations determine the sensorial transformation of the raw material and the production of new and tasty food.

Among the products fermented on the basis of milk, yogurt is defined as the product obtained by coagulation of the milk without eliminating the serum, by the action of specific lactic acid bacteria (*Streptococcus thermophilus* and *Lactobacillus delbrueckii* subsp. *bulgaricus*) which are inoculated jointly in the milk and are found in the finished products alive and viable and in great quantity.

The metabolic activities of the two lactic acid bacteria inoculated in yogurt guarantee the conservability of the product, determine the specific organoleptic properties and influence the structure itself and the consistency of the yogurt.

In addition, both in yogurt and in fermented milks in which the addition of lactic microflora having probiotic activity, a role is recognized which may be defined of the "medical" type, due to the beneficial action which the added microflora may carry out with respect to the human organism.

The yogurt, in the several types, (classical, with fruit, to drink with different amounts of fats, etc.) is unquestionably an extremely wholesome and beneficial product and endowed with very rich properties from the nutritive point of view, due to the presence of proteins, vitamins and mineral salts.

However, in spite of the well known beneficial effects exerted by fermented milks, including yogurt, there are groups of people who, for a reason of diet or health requirements, may not use products based on milk of animal origin. In particular, the number of people who have allergies and/or have an intolerance to the proteins of milk or to lactose is in substantial increase and therefore they may not consume yogurt, even if yogurt could be beneficial for them.

In addition, it is know that the lactic fermentation of the raw materials of vegetable origin relates mostly to the production of sauerkraut, olives, cucumbers or other fermented green vegetables and there are many patent documents which describe specific methodologies and processes for the production of these foods. By way of examples, the following patent documents are mention: U.S. Pat. No. 3,932,674; French 2,770,973; CN 1,175,366; G.B. 2,234,661; U.S. Pat. No. 4,342,786.

Among the documents which relate to the fermenation of substrates of vegetable origin, there should be mentioned in particular the patents which describe particular processes capable of allowing the fermentation of a milk derived from soya or other vegetables with the following production of fermented curdled milks or products similar to cheese. In particular, the patent EPA 0988793 describes a process capable of allowing the production of fermented soya milk. In this process the soya milk is treated with a coagulating agent, it is pasteurized and subsequently it is inoculated with singular strains or mixture of strains which promote the fermentation process up to reaching a pH of 3.5-5.0.

The document WO-A-97/43906 describes a process which provides a fermentation phase to obtain a cheese, a curdled material or a yogurt starting from soya milk.

On the contrary, the patent EP-A-0500132 describes a process for the production of a curdled material starting from a soya milk, in which process being provided a phase of acidification obtained by addition of a chemical agent or lactic acid bacteria having fermentation activity.

Finally, U.S. Pat. No. 3,950,544 describes a process capable of allowing the preparation of yogurt from a soya flour.

A great part of these documents have the object of producing products which allow the consumer to obtain proteinaceous materials and other nutritional substances also for people who do not tolerate and/or are allergic to proteins of milk and lactose.

It should also be kept in mind that in addition to the people mentioned hereinabove, some consumers give up the utilization of milk and its derivatives also for ethical reasons because they do not take products of animal origin. It should also be noted that the organoleptic properties of all the products derived from soya and in particular the lactic products and yogurt are rather scarce and certainly not comparable to the properties of analogous products produced on the basis of animal milk.

In addition, the procedures for the production of these products are relatively complex and expensive. All these facts have resulted in a modest diffusion of the products mentioned hereinabove which are sold mostly in stores of vegetable products, microbiotic and similar stores and only in very small quantities in normal commercial establishments and, in particular, in supermarkets and hypermarkets.

SUMMARY OF THE INVENTION

The first object of the present invention is to provide a process capable of achieving a product similar to yogurt obtained exclusively starting from raw materials of vegetable origin including soya. With the latter there is provided the integral utilization of the seed and without passage through the lactic phase. The process is simple and economical and in addition the organoleptic properties of the product obtained by the process are acceptable and superior to the products known at present.

In addition, by means of the process of this invention it is possible to offer to the consumer the possibility of choosing between a vegetable yogurt with or without fats and to obtain yogurts of a variety of taste.

According to this invention, the process for the preparation of vegetable yogurt involves fermentation and the starting material is characterized by the fact that it requires a plurality of vegetable substances of different vegetable species, which are ground and mixed in different ratios. In fact the process of the invention may be carried out starting from different types of fruit and green vegetables. In particular, in the typology of the product called vegetable biological yogurt the green vegetables and the fruit originate from cultivation of biological types certified as such according to the laws in force and do not contain genetic materials or proteins of transgenic origin.

DETAILED DESCRIPTION OF THE INVENTION

At first the green vegetables and/or the fruit are washed to eliminate residues from the ground or other contaminating material. Then the skin or more external parts when lettuce, cabbage or savoy is used, are removed and afterwards the remainder is ground according to necessity using a suitable apparatus.

At the end of the grinding phase the addition of water in variable amounts is carried out according to the type of green vegetables being used for the purpose of achieving the desired consistency. The concentration of sugars and the values of pH which may be necessary, are preferably brought to values compatible with the development of lactic bacteria mixing in suitable ratios of different typologies of fruit and/or green vegetables.

For the purpose of avoiding the development of the natural microflore present in green vegetables or in the fruit used as the starting material or acquired from the environment during the phases of washing, preparation and grinding, the step of proceeding successively to a treatment of thermal reclamation (pasteurization) is carried out. The latter step is carried out at a temperature of 70°-90° for 10 seconds, in manner to guarantee both the destruction of the present microflore and the irreversible denaturation of the enzymes which might cause the formation of defects in the product.

After the pasteurization phase is ended, the vegetable substrate is cooled and it is maintained at a temperature compatible with the development of the lactic acid bacteria which are utilized to carry out the fermentation process.

In the case in which the choice is made to operate exclusively with the two microbial species (*Streptococcus Thermophilus* and *Lactobacillus delbrueckii* subsp. *bulgaricus*) utilized for the production of yogurt from animal milk, the temperature is kept at a value of about 40° C.

On the contrary, if the choice is made to proceed to the inoculation of mesophile microorganisms, as *Lactobacillus plantarum, Lactobacillus paracasei, Lactobacillus sakei, Lactobacillus curvatus, Leuconostoc* spp., it is necessary to operate at a temperature of about 30° C. The lactic acid bacteria added to the vegetable substrate may be selected among strains already available in commerce in lyophilized form, which are usually utilized for the production of yogurt, fermented vegetables or vegetables put in bags.

After a preliminary phase of activation of the dehydrated cultures in isotonic solution (peptonated water or saline solution), the inoculation is carried out in a manner which must be such as to guarantee for each microorganism the presence of at least 1,000,000 units forming a colony per gram of vegetable substrate.

In addition to the fermenting microflora mentioned hereinabove, probiotic flora may be added. They are constituted by particular strains of lactic acid bacteria or by bifidobacteria which are selected in view of the beneficial action which they may manifest on the health of the consumer.

The fermentation is carried out at a controlled temperature for 1-2 days, up to reaching a final pH value of 3.8-4.5.

It is important to prevent the pH from reaching lower values because they could affect the vitality of the present lactic acid bacteria and could reduce their presence in the product ready for consumption.

On the other hand, pH values higher than 4.5 could cause the development of pathogenous microflora or alternating substances such as sporigenous microorganisms surviving the pasteurization treatment.

At the end of the fermentation phase substances as fragrances and/or natural thickening agents, fruit puree, fruit in small pieces or cereals may be added for the purpose of obtaining the desired taste, flavor and consistency.

Finally the product is packaged in small pots or jars and is kept at a refrigeration temperature up to the moment of consumption. Maintaining the cooling in the phases of transportation, commercialization and conservation must be guaranteed for the purpose of maintaining a high concentration of alive and vital lactic acid bacteria in the finished product in the same manner as this is requested in the yogurt produced from animal milk.

As already mentioned hereinabove it is possible prior to the fermentation step to add fats or vegetable oils so that the yogurt being obtained contains some fats but only of vegetable oils.

Other features of the invention will become apparent in the course of the following description of exemplary embodiments which are given for illustration of the invention and are not intended to be limiting thereof.

The following examples, other than Example 9, concern fermentations performed at 37° C. using a single vegetable or fruit product or a mixture of different vegetable products inoculated with a mixed lactic acid bacteria starter culture consisting of *Lactobacillus delbrueckii* subsp. *bulgaricus, Streptococcus thermophilus* and *Lactobacillus plantarum*. Similar fermentation processes may be performed using starter cultures consisting of defined strains of mesophilic (fermentation temperatures 30-32° C.) or thermophilic (fermentation temperatures 40° C.) lactic acid bacteria.

EXAMPLE 1

Melon (Puree)

Step 1. Preparation of the Puree

After removing the skin and the seeds, the melon is cut into small pieces and homogenized in a blender at maximum speed. The homogenization is carried out until a melon puree is obtained. The puree has a pH ranging from 6.00 to 6.50 depending on the type of melon. The puree is then pasteurized at a temperature of 85° C. for 10 seconds and cooled to a temperature of 37° C. which is suitable for the inoculum of lactic acid bacteria. When an industrial pasteurization process is performed a plate or tubular heat exchanger pasteurizer is used at the following conditions: 85° C. with 10 seconds holding (or other time-temperature combinations that can guarantee the destruction of pathogenic or spoilage microorganisms that could be present in the puree). Finally, after cooling to 37° C., the puree is inoculated with the lactic bacterial starter. Before the industrial pasteurization, it is better to submit the puree to an outgassing step in order to avoid possible oxidative problems in the puree.

Step 2. Preparation of the Lactic Acid Bacteria Inoculum

Freeze-dried cultures of *Lactobacillus delbrueckii* subsp. *bulgaricus, Streptococcus thermophilus* and *Lactobacillus plantarum* are used. Each culture is rehydrated in peptone water (1 g/l peptone, 8.5 g/l NaCl) at 37° C. for 15 minutes.

Each microorganism is inoculated in order to get a final concentration of 1,000.000 c.f.u. (colony forming units) per g. of puree.

Step 3. Fermentation

Fermentation is carried out at temperature of 37° C.; pH is checked continuously and the fermentation is stopped when a final pH of 3.9-4.0 is reached (generally after 16-18 hours). The total concentration of lactic acid bacteria at the end of fermentation should be at least 100,000,000 c.f.u./g.

EXAMPLE 2

Melon and Pear (Puree)

Each fruit puree is prepared separately. The melon puree is prepared as described in Example 1. The pear is washed, the skin and seeds are removed and the pulp is cut into small pieces. The homogenization is carried out at maximum blender speed until an homogeneous pear puree is obtained. The melon and pear puree are then mixed in order to get a mixture showing a pH around 5.8 (for instance 90% melon, 10% pear, or 80% melon, 20% pear). The mixture is then pasteurized at a temperature of 85° C. for 10 seconds and cooled to a temperature of 37° C. which is suitable for the inoculum of lactic acid bacteria. The inoculum and the fermentation processes are carried out as described in Example 1. When an industrial process is performed, the pasteurization is carried out with a plate or tubular heat exchanger pasteurizer as described in Example 1.

EXAMPLE 3

Carrot (Puree)

The carrot is washed, cut into small pieces and homogenized in a blender at maximum speed. The homogenization is carried out until an homogenous carrot puree is obtained. The consistency of the puree may be eventually adjusted adding a suitable quantity of water. The puree which show a pH of about 6.20 is then pasteurized at a temperature of 85° C. for 10 seconds and cooled to a temperature of 37° C. which is suitable for the inoculum of lactic acid bacteria.

The inoculum and the fermentation processes are carried out as described in Example 1. When an industrial process is performed, the pasteurization is carried out with a plate or tubular heat exchanger pasteurizer as described in Example 1.

EXAMPLE 4

Fennel (Puree)

The fennel is washed, and after removing the most external parts, is cut into small pieces and homogenized in a blender at maximum speed. The homogenization is carried out until an homogeneous fennel puree is obtained. The consistency of the puree may be eventually adjusted adding a suitable quantity of water. The puree which show a pH of about 6.00 is then pasteurized at a temperature of 85° C. for 10 seconds and cooled to a temperature of 37° C. which is suitable for the inoculum of lactic acid bacterial. The inoculum and the fermentation processes are carried out as described in Example 1. When an industrial process is performed, the pasteurization is carried out with a plate or tubular heat exchanger pasteurizer as described in Example 1.

EXAMPLE 5

Lettuce (Puree)

The lettuce is washed and after removing the most external parts, is cut into small pieces and homogenized in a blender at maximum speed. The homogenization is carried out until an homogeneous lettuce puree is obtained. The consistency of the puree may be eventually adjusted adding a suitable quantity of water. The puree which show a pH of about 6.10 is then pasteurized at a temperature of 85° C. for 10 seconds and cooled to a temperature of 37° C. which is suitable for the inoculum of lactic acid bacteria. The inoculum and fermentation processes are carried out as described in Example 1. When an industrial process is performed, the the pasteurization is carried out with a plate or tubular heat exchanger pasteurizer as described in Example 1.

EXAMPLE 6

Carrot, Fennel and Lettuce (Puree)

Each vegetable puree is prepared separately, as described in Examples 3, 4 and 5. The puree are then mixed in order to get a mixture with a pH that should not be below 6.10 (for instance carrot puree, fennel puree and lettuce puree in a 1:1:1 ratio). The consistency of the puree may be eventually adjusted adding a suitable quantity of water.

The mixture is then pasteurized at a temperature of 85° C. for 10 seconds and cooled to a temperature of 37° C. which is suitable for the inoculum of lactic acid bacteria. The inoculum and the fermentation processes are carried out as described in Example 1. When an industrial process is performed, the pasteurization is carried out with a plate or tubular heat exchanger pasteurizer as described in Example 1.

EXAMPLE 7

Cabbage, Carrot and Celery (Puree)

Each vegetable puree is prepared separately. The vegetables are washed and, after removing the most external parts, are cut into small pieces and then homogenized in a blender at maximum speed. The homogenization is carried out until an homogeneous puree is obtained. The three puree are mixed in order to get a mixture with a pH that should not be below 5.8 (for instance 80% cabbage, 10% carrot, 10% celery). The consistency of the mixture may be eventually adjusted adding a suitable quantity of water. The mixture is then pasteurized at a temperature of 85° C. for 10 seconds and cooled to a temperature of 37° C. which is suitable for the inoculum of lactic acid bacteria. The fermentation is carried out at a temperature of 37° C.: pH, is checked continuously and the fermentation is stopped when a final pH of 4.0 is reached (generally after 18-20 hours). When an industrial process is performed, the pasteurization is carried out with a plate or tubular heat exchanger pasteurizer as described in Example 1.

EXAMPLE 8

Carrot (Juice)

The carrot is washed, cut into small pieces and then centrifuged in order to extract the juice. The juice which shows a pH of about 6.20 is then pasteurized at a temperature of 85° C. for 10 seconds and cooled to a temperature of 37° C. which is suitable for the inoculum of lactic acid bacterial. The inoculum and the fermentation processes are carried out as described in Example 1. When an industrial process is performed, the pasteurization is carried with a plate or tubular heat exchanger pasteurizer as described in Example 1.

EXAMPLE 9

Cabbage (Juice)

The cabbage is washed and, after removing the most external parts, is cut into small pieces and then centrifuged at maximum speed in order to extract the juice. The juice which shows a pH of 6.00 is then pasteurized at a temperature of 85° C. for 10 seconds and cooled to a temperature of 32° C. which is suitable for the inoculum of lactic acid bacteria. A freeze-dried culture *Lactobacillus plantarum* is used. The culture is rehydrated in peptone water (1 g/l peptone, 8.5 g/l NaCl) at 32° C for 15 minutes and inoculated in the order to get final concentration of 1,000,000 c.f.u. (colony forming units)/g. of juice. The fermentation is carried out at a temperature of 32° C.: pH is checked continuously and the fermentation is stopped when a final pH of 4.0 is reached (generally after 18-20 hours). The total concentration of *Lactobacillus plantarum* at the end of fermentation should be at least 100,000,000 c.f.u./g. When an industrial process is performed, the pasteurization is carried out with a plate or tubular heat exchanger pasteurizer as described in Example 1.

EXAMPLE 10

Fennel (Juice)

The fennel is washed, and after having removed the most external parts, is cut into small pieces and then centrifuged at maximum speed in order to extract the juice. The juice which shows a pH of 6.00 is then pasteurized at a temperature of 85° C. for 10 seconds and cooled to a temperature of 37° C. which is suitable for the inoculum of lactic acid bacteria. The inoculum and the fermentation processes are carried out as described in Example 1. When an industrial process is performed, the pasteurization is carried out with a plate or tubular heat exchanger pasteurizer as described in Example 1.

EXAMPLE 11

Lettuce (Juice)

The lettuce is washed and, after removing the most external parts, is cut into small pieces, and then centrifuged at maximum speed in order to extract the juice. The juice which shows a pH of 6.10 is then pasteurized at a temperature of 85° C. for 10 seconds and cooled to a temperature of 37° C. which is suitable for the inoculum of lactic acid bacteria. The inoculum and the fermentation processes are carried out as described in Example 1. When an industrial process is performed, the pasteurization is carried out with a plate or tubular heat exchanger pasteurizer as described in Example 1.

The process described hereinabove is intrinsically simple and economical to carry out and allows obtaining an alimentary product which combines the beneficial properties of a yogurt of animal origin with the taste of fruit or green vegetables. The taste which is obtained is extremely variable so that it may be adapted to the particular requirements of the consumer and finally also the amount of fat contained in the yogurt may be varied within broad limits.

What is claimed is:

1. A process for the preparation of a vegetable juice yogurt through fermentation, said process comprising:
    selecting a vegetable from the group consisting of carrots, fennel, lettuce and cabbage:
    extracting the juice from the vegetable by centrifuging the vegetable after the vegetable has been washed and cut into small pieces;
    pasteurizing the juice so as to destroy pathogenic or spoilage microorganisms therein;
    cooling the juice to a temperature compatible with the development of a lactic acid bacteria used in fermentation of the juice;
    inoculating the pasteurized juice with a lactic acid bacteria taken from defined strains of mesophilic or thermophilic lactic acid bacteria to obtain a final concentration for each microorganism of 1,000,000 colony forming units per gram of juice; and
    fermenting the inoculated juice at a temperature compatible with the lactic acid bacteria used until a final pH of 3.8-4.5 is obtained and a total concentration of lactic acid bacteria of at least 100,000,000 colony forming units per gram of inoculated juice.

2. The process as defined in claim 1, wherein the strains of mesophilic lactic acid bacteria comprise *Lactobacillus plantarum, Lactobacillus paracasei, Lactobacillus sakei, Lactobacillus curvatus* and *Leuconostoc* spp., and the temperature to which the juice is cooled prior to inoculation is 30° C. and the fermentation temperature is 30° C.

3. The process as defined in claim 1, wherein the strains of thermophilic lactic acid bacteria comprise *Lactobacillus delbrueckie* subsp. *bulgaricus* and *Streptococcus thermophilus*, and the temperature to which the juice is cooled prior to inoculation is 40° C. and the fermentation temperature is 40° C.

4. The process as defined in claim 1, wherein the lactic acid bacteria comprises a mixed lactic acid bacteria starter culture consisting of *Lactobacillus delbrueckii* subsp. *bulgaricus, Streptococcus thermophilus*, and *Lactobacillus plantarum*, and the temperature to which the juice is cooled prior to inoculation is 37° C. and the fermentation temperature is 37° C. and fermentation is stopped when a final pH of 3.90-4.0 is reached.

5. The process as defined in claim 1, wherein cabbage comprises the vegetable from which the juice is extracted after the cabbage is washed, the most external parts removed and it is cut into small pieces, the lactic acid bacteria is *Lactobacillus plantarum*, the temperature to which the juice is cooled following pasteurization is 32° C., and fermentation is carried out at a temperature of 32° C.

6. The process as defined in claim 1, wherein the consistency of the juice is adjusted prior to pasteurizing by the addition of water.

* * * * *